United States Patent
Huang-Fu et al.

(10) Patent No.: US 10,917,838 B2
(45) Date of Patent: Feb. 9, 2021

(54) HANDLING OF PLMN-SPECIFIC ATTEMPT COUNTER IN MOBILE COMMUNICATIONS

(71) Applicant: MediaTek Inc., Hsinchu (TW)

(72) Inventors: Chien-Chun Huang-Fu, Hsinchu (TW); Marko Niemi, Oulu (FI)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 16/407,403

(22) Filed: May 9, 2019

(65) Prior Publication Data
US 2019/0349845 A1 Nov. 14, 2019

Related U.S. Application Data

(60) Provisional application No. 62/670,629, filed on May 11, 2018, provisional application No. 62/674,316, filed on May 21, 2018.

(51) Int. Cl.
| | |
|---|---|
| *H04W 12/12* | (2009.01) |
| *H04W 48/16* | (2009.01) |
| *H04W 48/18* | (2009.01) |
| *H04W 84/04* | (2009.01) |

(52) U.S. Cl.
CPC ....... *H04W 48/16* (2013.01); *H04W 12/1202* (2019.01); *H04W 12/1204* (2019.01); *H04W 48/18* (2013.01); *H04W 84/042* (2013.01)

(58) Field of Classification Search
CPC ............. H04W 48/16; H04W 12/1202; H04W 12/1204; H04W 48/18; H04W 84/042
See application file for complete search history.

(56) References Cited

U.S. PATENT DOCUMENTS

| | | | |
|---|---|---|---|
| 2013/0109377 A1 | 5/2013 | Al-Khudairi et al. | |
| 2017/0094501 A1* | 3/2017 | Huang-Fu | H04W 76/18 |
| 2017/0215134 A1 | 7/2017 | Liu | |
| 2019/0045423 A1* | 2/2019 | Kumar | H04W 68/005 |
| 2019/0116520 A1* | 4/2019 | Chaponniere | H04W 8/00 |

FOREIGN PATENT DOCUMENTS

| | | | |
|---|---|---|---|
| EP | 2555547 A1 | 2/2013 | |
| WO | WO 2016173307 A1 | 11/2016 | |
| WO | WO-2017135702 A1 * | 8/2017 | ............ H04W 60/04 |

OTHER PUBLICATIONS

China National Intellectual Property Administration, International Search Report and Written Opinion for International Patent Application No. PCT/CN2019/086427, dated Jun. 27, 2019.

\* cited by examiner

*Primary Examiner* — Moo Jeong
(74) *Attorney, Agent, or Firm* — Han IP PLLC; Andy M. Han

(57) ABSTRACT

Various examples pertaining to handling of Public Land Mobile Network (PLMN)-specific attempt counter in mobile communications are described. An apparatus (e.g., user equipment) detects an occurrence of a predefined condition. In response to the detecting, the apparatus performs certain operations, including: (i) adding a visited Public Land Mobile Network (VPLMN) identification (ID) to a list of one or more forbidden PLMNs stored in a storage device, (ii) removing the VPLMN ID from a list of extension of forbidden PLMNs stored in the storage device; and (iii) resetting a PLMN-specific attempt counter specific to the PLMN ID to zero.

20 Claims, 4 Drawing Sheets

US 10,917,838 B2

HANDLING OF PLMN-SPECIFIC ATTEMPT COUNTER IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/670,629 and 62/674,316, filed on 11 May 2018 and 21 May 2018, respectively. The contents of aforementioned applications are herein incorporated by reference in their entirety.

TECHNICAL FIELD

The present disclosure is generally related to mobile communications and, more particularly, to handling of Public Land Mobile Network (PLMN)-specific attempt counter in mobile communications.

BACKGROUND

Unless otherwise indicated herein, approaches described in this section are not prior art to the claims listed below and are not admitted as prior art by inclusion in this section.

According to current 3rd-Generation Partnership Project (3GPP) specification, it is possible that a user equipment (UE) adds a PLMN identification (ID) to a list of temporarily forbidden PLMNs in a Universal Subscriber Identity Module (USIM) card of the UE. However, there is no trigger or mechanism defined in the current 3GPP specification to reset a PLMN-specific attempt counter if a PLMN ID corresponding to the PLMN-specific attempt counter has been added to the list of forbidden PLMNs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of a UE detecting an occurrence of a predefined condition. Responsive to the detecting, the method may involve the processor performing certain operations, including: (i) adding a visited Public Land Mobile Network (VPLMN) identification (ID) to a list of one or more forbidden PLMNs stored in a storage device and (ii) resetting a PLMN-specific attempt counter specific to the PLMN ID to zero.

In one aspect, a method may involve a processor of a UE maintaining a PLMN-specific attempt counter for a PLMN selection procedure. The method may also involve the processor detecting an occurrence of a predefined condition. The method may further involve the processor resetting the PLMN-specific attempt counter to zero responsive to the detecting.

In one aspect, an apparatus implementable in a UE may include a processor which, during operation, may perform operations including: (a) maintaining a PLMN-specific attempt counter for a PLMN selection procedure; (b) detecting an occurrence of a predefined condition; and (c) resetting the PLMN-specific attempt counter to zero responsive to the detecting.

It is noteworthy that, although description provided herein may be in the context of certain radio access technologies, networks and network topologies such as $5^{th}$ Generation (5G)/New Radio (NR) or non-3GPP access in 5G system, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
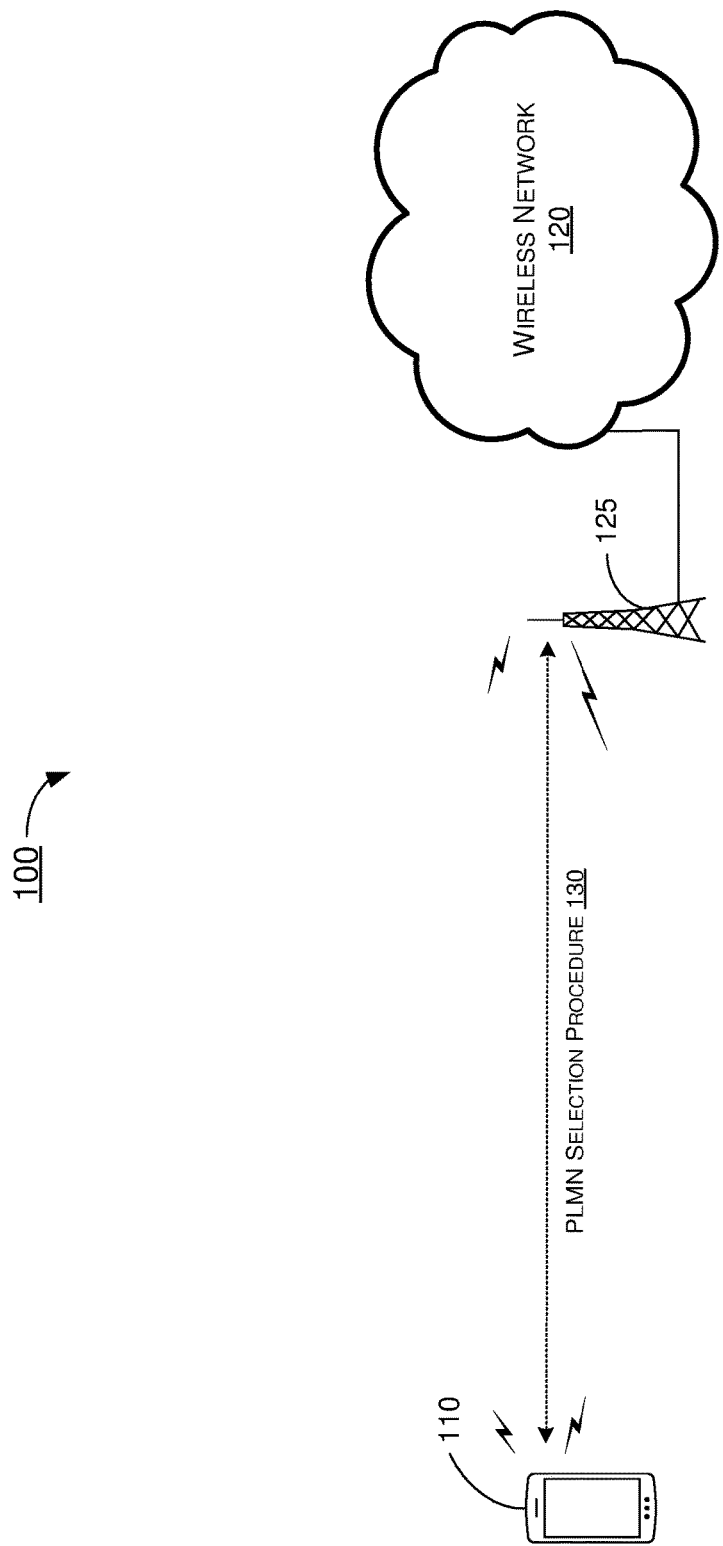
FIG. 1 is a diagram of an example scenario in which various solutions in accordance with the present disclosure may be implemented.

FIG. 1 illustrates an example scenario 100 in which various solutions in accordance with the present disclosure may be implemented. Referring to FIG. 1, scenario 100 may involve a UE 110 in wireless communication with a wireless network 120 (e.g., a 5G NR mobile network) via a base station 125 (e.g., a gNB or transmit-receive point (TRP)). In scenario 100, UE 110 may be in wireless communication with wireless network 120 via base station 125 to perform a PLMN selection procedure 130 according to the 3GPP specification. For instance, UE 110 may perform PLMN selection procedure 130 to camp on a PLMN corresponding to wireless network 120.

For forbidden PLMN list handling, UE 110 may maintain a PLMN-specific attempt counter for each PLMN in a list of temporarily forbidden PLMNs (herein interchangeably referred to as a list of extension of forbidden PLMNs). Under current 3GPP specification, UE 110 may deem a given PLMN as a forbidden PLMN (FPLMN) and, accordingly, place such PLMN on the list of temporarily forbidden PLMNs/list of extension of FPLMNs. For instance, UE 110 may store a PLMN ID of a FPLMN in the list which may be stored in a memory of UE 110 or a Universal Integrated Circuit Card (UICC) in UE 110.

There may be multiple conditions under which UE 110 may place a PLMN on the list of temporarily forbidden PLMNs/list of extension of FPLMNs. For instance, upon receipt of a message with Mobility Management (MM) cause #11 indicating "PLMN not allowed" with respect to a given PLMN when such message is not integrity-protected, UE 110 may place such PLMN on the list of temporarily forbidden PLMNs/list of extension of FPLMNs. Other conditions under which UE 110 may place a PLMN on the list of temporarily forbidden PLMNs/list of extension of FPLMNs may include, for example and without limitation, UE 110 being not configured to use timer T3245, UE 110 maintaining a list of PLMN-specific attempt counters for one or more FPLMNs, and a value of a PLMN-specific attempt counter for a visited PLMN (VPLMN) being less than a UE 110 implementation-specific maximum value (e.g., a threshold value).

Under a proposed scheme in accordance with the present disclosure, a PLMN-specific attempt counter may be reset for a given PLMN which has been placed on the list of forbidden PLMNs. That is, a value of the PLMN-specific attempt counter corresponding to such PLMN may be set to zero under the proposed scheme. For instance, when a VPLMN ID for a visited PLMN is added to the list of forbidden PLMNs (e.g., being stored in a memory of UE 110 or a UICC in UE 110), UE 110 may reset the PLMN-specific attempt counter associated with such PLMN by setting its value to zero.

Alternatively, or additionally, when the VPLMN ID for such visited PLMN is removed from the list of forbidden PLMNs, UE 110 may reset the PLMN-specific attempt counter associated with such PLMN by setting its value to zero. Alternatively, or additionally, when UE 110 is being switched off or switched on, UE 110 may reset the PLMN-specific attempt counter associated with such PLMN by setting its value to zero. Alternatively, or additionally, when a USIM card of UE 110 is being removed from UE 110 or inserted into UE 110, UE 110 may reset the PLMN-specific attempt counter associated with such PLMN by setting its value to zero. Alternatively, or additionally, when the USIM card of UE 110 is being replaced or otherwise switched to another USIM card, UE 110 may reset the PLMN-specific attempt counter associated with such PLMN by setting its value to zero. Under the proposed scheme, UE 110 may also reset PLMN-specific packet switched (PS) attempt counters by setting values of the PS attempt counters to zero.

Illustrative Implementations

Figure 2:
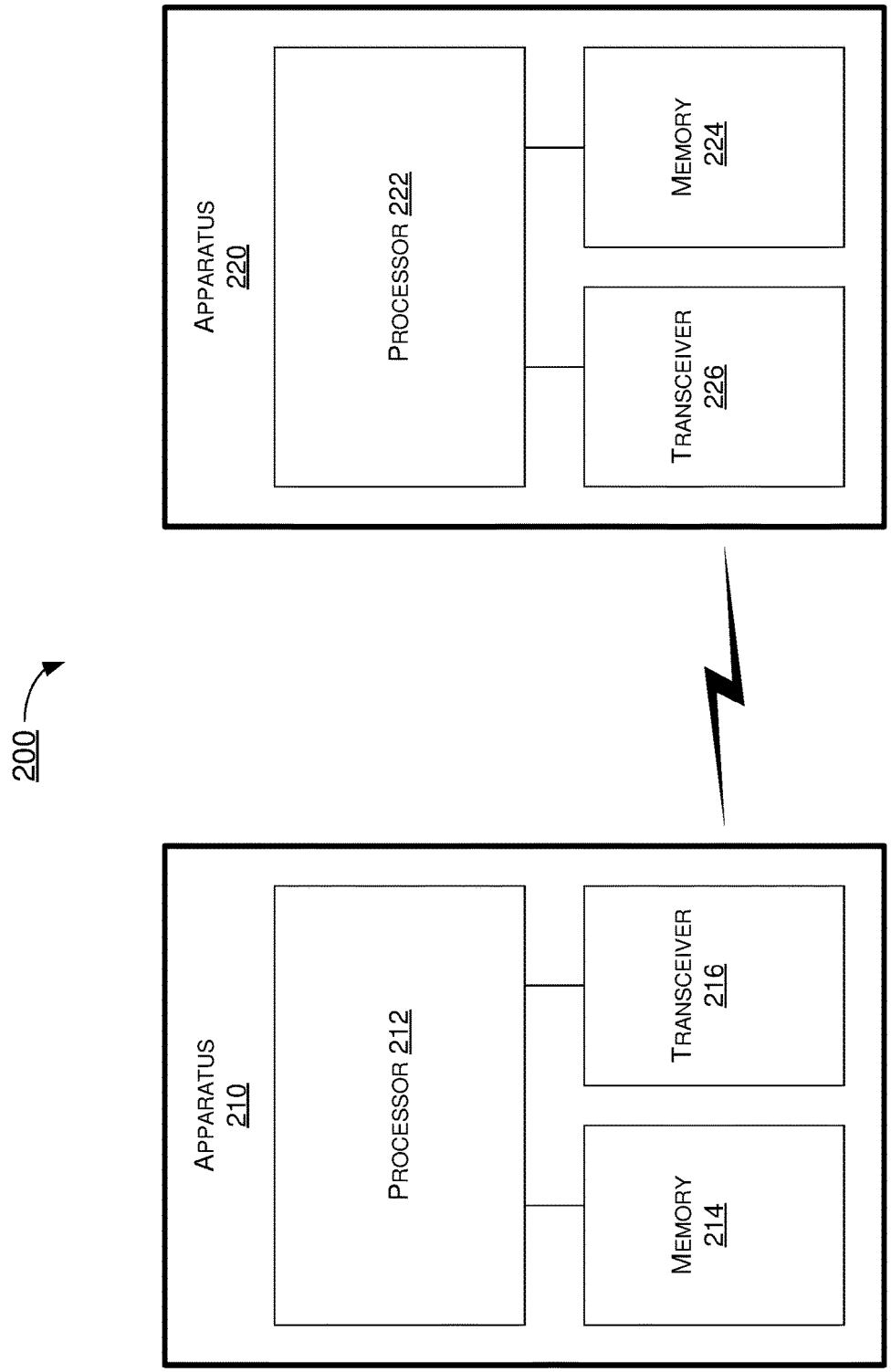
FIG. 2 is a block diagram of an example communication system in accordance with an implementation of the present disclosure.

FIG. 2 illustrates an example system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to improvement for handling of PLMN-specific attempt counter in mobile communications, including the various schemes described above with respect to various proposed designs, concepts, schemes, systems and methods described above, including scenario 100, as well as processes 300 and 400 described below.

Each of apparatus 210 and apparatus 220 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 210 and apparatus 220 may be implemented in a smartphone, a smart watch, a personal digital assistant, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to improvement for handling of PLMN-specific attempt counter in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 210 and apparatus 220 may be a communication entity capable of communicating with each other using various proposed schemes in accordance with the present disclosure. For illustrative purposes and without limitation, a description of capabilities of apparatus 210, as a UE, and apparatus 220, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 210 as a UE (e.g., UE 110), the same is also applicable to apparatus 220 as a network node or base station such as a gNB, TRP or eNodeB (e.g., network node 125) of a wireless network (e.g., wireless network 120) such as a 5G NR mobile network.

Under a proposed scheme in accordance with the present disclosure, processor 212 of apparatus 210 may detect, via transceiver 216, an occurrence of a predefined condition. In response to the detecting, processor 212 may perform various operations. For instance, processor 212 may add a VPLMN ID to a list of one or more forbidden PLMNs stored in a storage device (e.g., memory 214 or a UICC). Additionally, processor 212 may remove the VPLMN ID from a list of extension of forbidden PLMNs stored in the storage device. Moreover, processor 212 may reset a PLMN-specific attempt counter specific to the PLMN ID to zero.

In some implementations, the predefined condition may include apparatus 210 being not configured to use a timer T3245 in accordance with a 3GPP specification.

In some implementations, the predefined condition may include a message having been received by processor 212 via transceiver 216, with the message being not integrity-protected.

In some implementations, the predefined condition may include a list of PLMN-specific attempt counters being maintained for apparatus 210.

In some implementations, the predefined condition may include a value of the PLMN-specific attempt counter for a VPLMN being equal to a UE implementation-specific maximum value.

In some implementation, in adding the VPLMN ID to the list of one or more forbidden PLMNs stored in the storage device, processor 212 may add the VPLMN ID to the list of one or more forbidden PLMNs stored in memory 214 of apparatus 210 or a UICC. Alternatively, or additionally, in removing the VPLMN ID from the list of extension of forbidden PLMNs stored in the storage device, processor 212 may remove the VPLMN ID from the list of extension of forbidden PLMNs stored in memory 214 of apparatus 210 or the UICC.

Under a proposed scheme in accordance with the present disclosure, processor 212 may maintain, in memory 214 or a UICC, a PLMN-specific attempt counter for a PLMN selection procedure (e.g., PLMN selection procedure 130). Additionally, processor 212 may detect an occurrence of a predefined condition. Moreover, processor 212 may reset the PLMN-specific attempt counter to zero responsive to the detecting.

In some implementation, the predefined condition may include apparatus 210 being switched off or switched on.

In some implementation, the predefined condition may include a USIM card of apparatus 210 being removed or inserted.

In some implementation, the predefined condition may include a USIM card of apparatus 210 being replaced or switched to another USIM card.

In some implementation, processor 212 may also reset PLMN-specific packet switched (PS) attempt counters to zero responsive to the detecting.

Illustrative Processes

Figure 3:
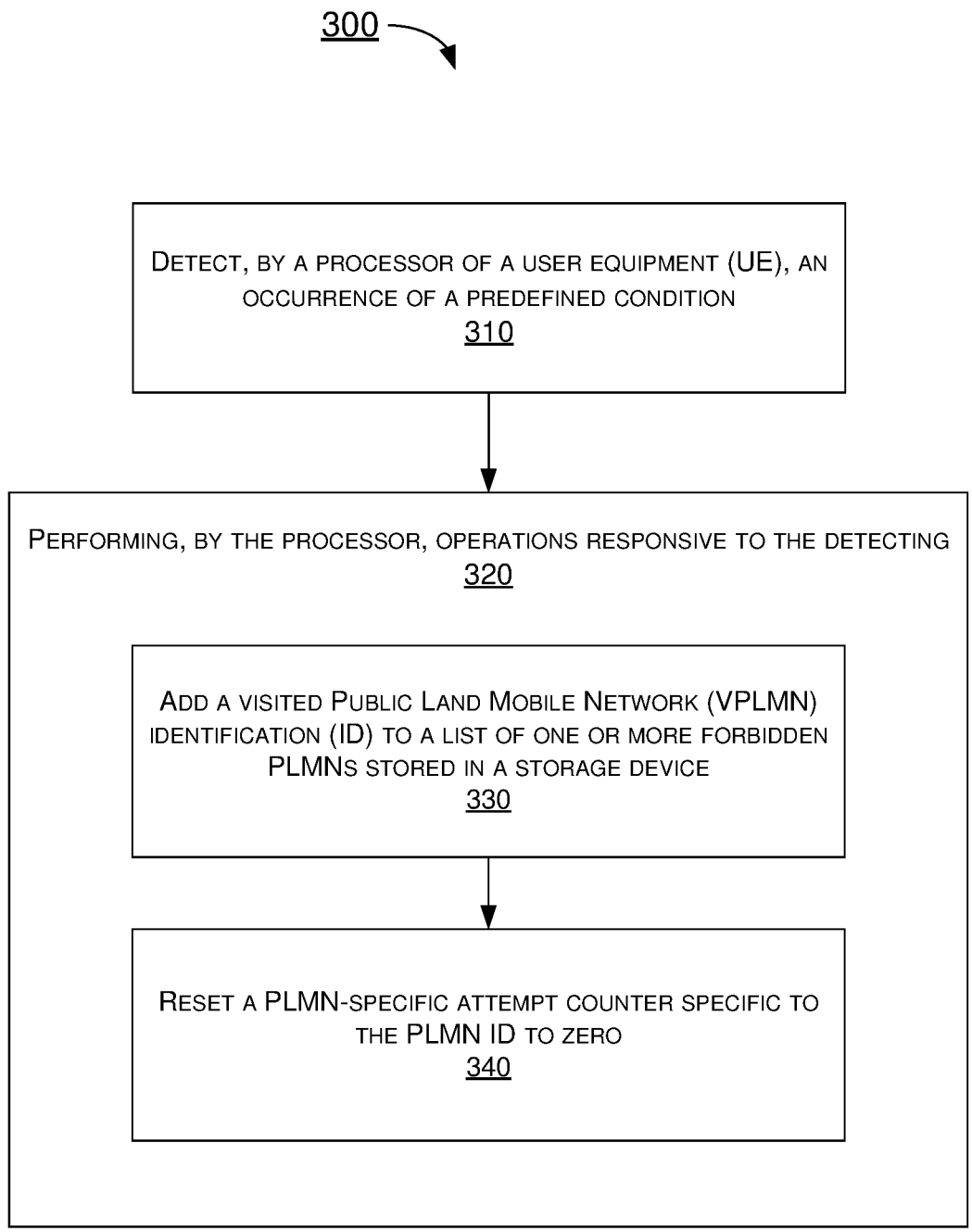
FIG. 3 is a flowchart of an example process in accordance with an implementation of the present disclosure.

FIG. 3 illustrates an example process 300 in accordance with an implementation of the present disclosure. Process 300 may represent an aspect of implementing various proposed designs, concepts, schemes, systems and methods described above, whether partially or entirely, including scenario 100. More specifically, process 300 may represent an aspect of the proposed concepts and schemes pertaining to improvement for handling of PLMN-specific attempt counter in mobile communications. Process 300 may include one or more operations, actions, or functions as illustrated by one or more of blocks 310 and 320 as well as sub-blocks 330 and 340. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a network node or base station (e.g., network node 125) of a wireless network (e.g., wireless network 120). Process 300 may begin at block 310.

At 310, process 300 may involve processor 212 of apparatus 210 detecting, via transceiver 216, an occurrence of a predefined condition. Process 300 may proceed from 310 to 320.

At 320, process 300 may involve processor 212 performing operations in response to the detecting. For instance, process 300 may involve processor 212 performing operations as represented by 330 and 340.

At 330, process 300 may involve processor 212 adding a VPLMN ID to a list of one or more forbidden PLMNs stored in a storage device (e.g., memory 214 or a UICC). Process 300 may proceed from 330 to 340.

At 340, process 300 may involve processor 212 resetting a PLMN-specific attempt counter.

For instance, process 300 may involve processor 212 resetting a PLMN-specific attempt counter specific to the PLMN ID to zero.

In some implementations, the predefined condition may include apparatus 210 being not configured to use a timer T3245 in accordance with a 3GPP specification.

In some implementations, the predefined condition may include a message having been received by processor 212 via transceiver 216, with the message being not integrity-protected.

In some implementations, the predefined condition may include a list of PLMN-specific attempt counters being maintained for apparatus 210.

In some implementations, the predefined condition may include a value of the PLMN-specific attempt counter for a VPLMN being equal to a UE implementation-specific maximum value.

In some implementation, in adding the VPLMN ID to the list of one or more forbidden PLMNs stored in the storage device, process 300 may involve processor 212 adding the VPLMN ID to the list of one or more forbidden PLMNs stored in memory 214 of apparatus 210 or a UICC.

Figure 4:
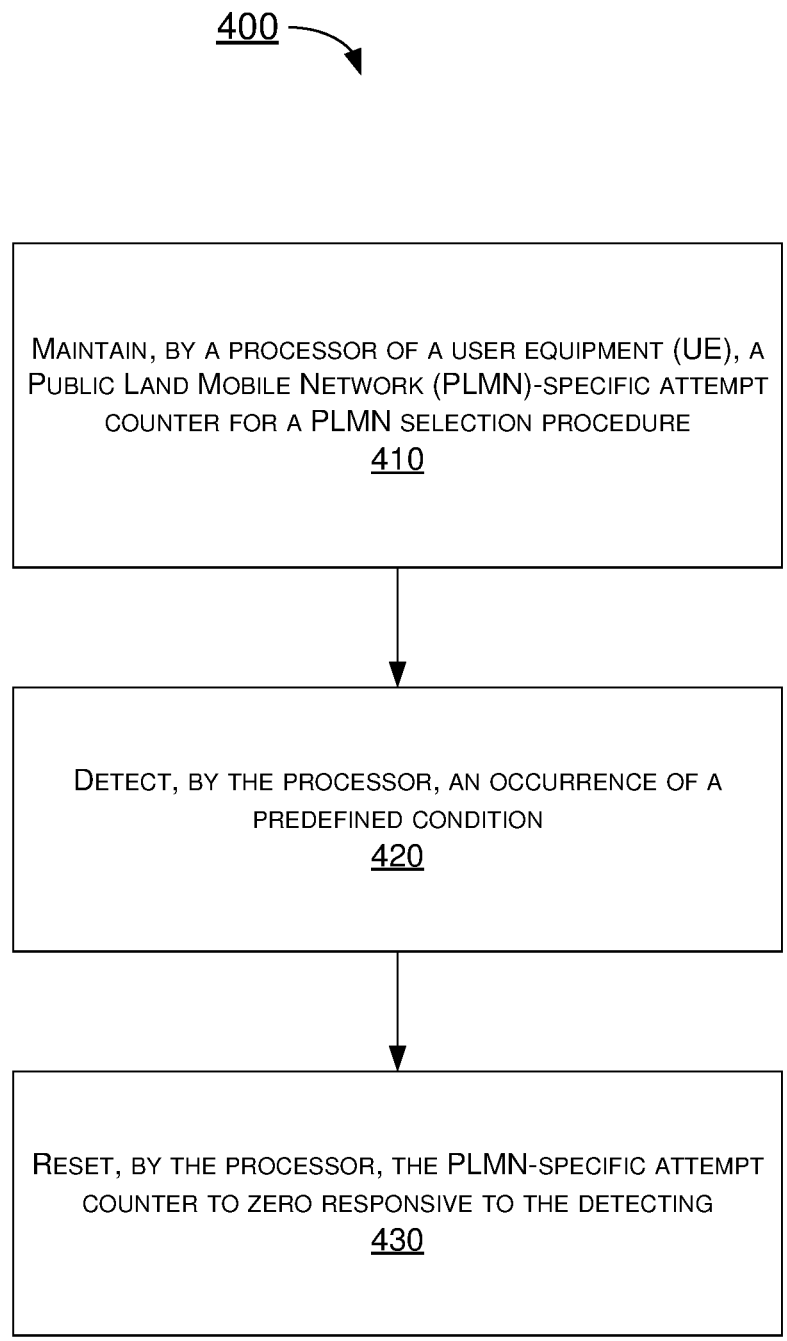
FIG. 4 is a flowchart of an example process in accordance with an implementation of the present disclosure.

FIG. 4 illustrates an example process 400 in accordance with an implementation of the present disclosure. Process 400 may represent an aspect of implementing various proposed designs, concepts, schemes, systems and methods described above, whether partially or entirely, including scenario 100. More specifically, process 400 may represent an aspect of the proposed concepts and schemes pertaining to improvement for handling of PLMN-specific attempt counter in mobile communications. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a network node or base station (e.g., network node 125) of a wireless network (e.g., wireless network 120). Process 400 may begin at block 410.

At 410, process 400 may involve processor 212 of apparatus 210 maintaining, in memory 214 or a U ICC, a PLMN-specific attempt counter for a PLMN selection procedure (e.g., PLMN selection procedure 130). Process 400 may proceed from 410 to 420.

At 420, process 400 may involve processor 212 detecting an occurrence of a predefined condition. Process 400 may proceed from 420 to 430.

At 430, process 400 may involve processor 212 resetting the PLMN-specific attempt counter to zero responsive to the detecting.

In some implementation, the predefined condition may include apparatus 210 being switched off or switched on.

In some implementation, the predefined condition may include a USIM card of apparatus 210 being removed or inserted.

In some implementation, the predefined condition may include a USIM card of apparatus 210 being replaced or switched to another USIM card.

In some implementation, process 400 may further involve processor 212 resetting PLMN-specific packet switched (PS) attempt counters to zero responsive to the detecting.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    detecting, by a processor of a user equipment (UE), an occurrence of a predefined condition; and
    performing, by the processor responsive to the detecting, operations comprising:
        adding a Public Land Mobile Network (PLMN) identification (ID) to a list of one or more forbidden PLMNs stored in a storage device; or
        removing the PLMN ID from a list of extension of forbidden PLMNs stored in the storage device; and
    resetting, by the processor, a PLMN-specific attempt counter specific to the PLMN ID to zero responsive to the adding or removing.

2. The method of claim 1, wherein the predefined condition comprises the UE being not configured to use a timer T3245 in accordance with a 3rd-Generation Partnership Project (3GPP) specification.

3. The method of claim 1, wherein the predefined condition comprises a message having been received by the processor, and wherein the message is not integrity-protected.

4. The method of claim 1, wherein the predefined condition comprises a list of PLMN-specific attempt counters being maintained for the UE.

5. The method of claim 1, wherein the predefined condition comprises a value of the PLMN-specific attempt counter for a PLMN being equal to a UE implementation-specific maximum value.

6. The method of claim 1, wherein:
    the adding of the PLMN ID to the list of one or more forbidden PLMNs stored in the storage device comprises adding the PLMN ID to the list of one or more forbidden PLMNs stored in a memory of the UE or a Universal Integrated Circuit Card (UICC).

7. A method, comprising:
    maintaining, by a processor of a user equipment (UE), a Public Land Mobile Network (PLMN)-specific attempt counter for a PLMN selection procedure;
    detecting, by the processor, an occurrence of a predefined condition; and
    resetting, by the processor, the PLMN-specific attempt counter to zero responsive to the detecting,
    wherein the predefined condition comprises a PLMN identification (ID) associated with the PLMN-specific attempt counter being added to or removed from a list of one or more forbidden PLMNs.

8. The method of claim 7, wherein the predefined condition further comprises the UE being switched off or switched on.

9. The method of claim 7, wherein the predefined condition further comprises a Universal Subscriber Identity Module (USIM) card of the UE being removed or inserted.

10. The method of claim 7, wherein the predefined condition further comprises a Universal Subscriber Identity Module (USIM) card of the UE being replaced or switched to another USIM card.

11. The method of claim 7, further comprising:
    resetting, by the processor, PLMN-specific packet switched (PS) attempt counters to zero responsive to the detecting.

12. An apparatus implementable in a user equipment (UE), comprising:
    a processor which, during operation, performs operations comprising:
        maintaining a Public Land Mobile Network (PLMN)-specific attempt counter for a PLMN selection procedure;
        detecting an occurrence of a predefined condition; and
        resetting the PLMN-specific attempt counter to zero responsive to the detecting,
        wherein the predefined condition comprises a PLMN identification (ID) associated with the PLMN-specific attempt counter being added to or removed from a list of one or more forbidden PLMNs.

13. The apparatus of claim 12, wherein the predefined condition further comprises the UE being not configured to use a timer T3245 in accordance with a 3rd-Generation Partnership Project (3GPP) specification.

14. The apparatus of claim 12, wherein the predefined condition further comprises a message having been received by the processor, and wherein the message is not integrity-protected.

15. The apparatus of claim 12, wherein the predefined condition further comprises a list of PLMN-specific attempt counters being maintained for the UE.

16. The apparatus of claim 12, wherein the predefined condition comprises a value of the PLMN-specific attempt counter for a PLMN being equal to a UE implementation-specific maximum value.

17. The apparatus of claim 12, wherein the predefined condition further comprises the UE being switched off or switched on.

18. The apparatus of claim 12, further comprising:
a Universal Subscriber Identity Module (USIM) card,
wherein the predefined condition further comprises either:
the USIM card being removed or inserted, or
the USIM card being replaced or switched to another USIM card.

19. The apparatus of claim 12, wherein, responsive to detecting the occurrence of the predefined condition, the processor further performs operations comprising:
adding a Public Land Mobile Network (PLMN) identification (ID) to the list of one or more forbidden PLMNs stored in a storage device.

20. The apparatus of claim 12, wherein, responsive to detecting the occurrence of the predefined condition, the processor further resets PLMN-specific packet switched (PS) attempt counters to zero.

* * * * *